United States Patent
Covell et al.

(10) Patent No.: US 9,137,529 B1
(45) Date of Patent: Sep. 15, 2015

(54) MODELS FOR PREDICTING SIMILARITY BETWEEN EXEMPLARS

(71) Applicant: Google Inc., Mountain View, CA (US)

(72) Inventors: Michele Covell, Palo Alto, CA (US); Mei Han, Palo Alto, CA (US); Saurabh Mathur, Sunnyvale, CA (US); Shumeet Baluja, Santa Clara, CA (US); Vivek Kwatra, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/208,352

(22) Filed: Mar. 13, 2014

Related U.S. Application Data

(63) Continuation of application No. 13/100,872, filed on May 4, 2011, now Pat. No. 8,712,930.

(60) Provisional application No. 61/372,079, filed on Aug. 9, 2010.

(51) Int. Cl.
  *G06F 15/18* (2006.01)
  *H04N 19/105* (2014.01)
  *H04N 19/17* (2014.01)
  *H04N 19/189* (2014.01)

(52) U.S. Cl.
  CPC ..... *H04N 19/00024* (2013.01); *H04N 19/0026* (2013.01); *H04N 19/00345* (2013.01)

(58) Field of Classification Search
  CPC .................................................. G06F 17/30247
  USPC ..................................... 706/12; 382/103, 224
  See application file for complete search history.

(56) References Cited

U.S. PATENT DOCUMENTS

| | | | |
|---|---|---|---|
| 6,029,195 | A | 2/2000 | Herz |
| 6,108,448 | A | 8/2000 | Song et al. |
| 6,115,035 | A | 9/2000 | Compton et al. |
| 6,539,460 | B2 | 3/2003 | Castelli et al. |
| 6,571,016 | B1 | 5/2003 | Mehrotra et al. |
| 6,574,279 | B1 | 6/2003 | Vetro et al. |
| 6,625,319 | B1 | 9/2003 | Krishnamachari |
| 6,771,828 | B1 | 8/2004 | Malvar |
| 7,162,091 | B2 | 1/2007 | Wang et al. |

(Continued)

OTHER PUBLICATIONS

Baluja, S., et al., "Beyond "Near-Duplicates": Learning Hash Codes for Efficient Similar-Image Retrieval" ICPR'10, International Conference on Pattern Recognition, Aug. 20, 2010, pp. 543-547.
Barnes, C., et al., "PatchMatch: A Randomized Correspondence Algorithm for Structural Image Editing," ACM Transactions on Graphics (Proc. SIGGRAPH), Aug. 2009, 10 pages.

(Continued)

*Primary Examiner* — Jeffrey A Gaffin
*Assistant Examiner* — Ola Olude Afolabi
(74) *Attorney, Agent, or Firm* — Fenwick & West LLP

(57) ABSTRACT

An exemplar dictionary is built from exemplars of digital content for determining predictor blocks for encoding and decoding digital content. The exemplar dictionary organizes the exemplars as clusters of similar exemplars. Each cluster is mapped to a label. Machine learning techniques are used to generate a prediction model for predicting a label for an exemplar. The prediction model can be a hashing function that generates a hash key corresponding to the label for an exemplar. The prediction model learns from a training set based on the mapping from clusters to labels. A new mapping is obtained that improves a measure of association between clusters and labels. The new mapping is used to generate a new prediction model. This process is repeated in order to iteratively refine the machine learning modes generated.

20 Claims, 7 Drawing Sheets

(56) References Cited

U.S. PATENT DOCUMENTS

| | | | |
|---|---|---|---|
| 7,181,072 | B2 | 2/2007 | Wang et al. |
| 7,251,376 | B2 | 7/2007 | Qian et al. |
| 7,397,858 | B2 | 7/2008 | Garrido et al. |
| 7,471,724 | B2 | 12/2008 | Lee |
| 7,647,618 | B1 | 1/2010 | Hunter et al. |
| 7,836,050 | B2 | 11/2010 | Jing et al. |
| 7,961,922 | B2 | 6/2011 | Spence et al. |
| 8,169,497 | B2 | 5/2012 | Wan |
| 8,363,953 | B2 | 1/2013 | Kameyama |
| 8,364,720 | B2 | 1/2013 | Levy |
| 8,478,057 | B1 | 7/2013 | Cui et al. |
| 8,515,193 | B1 | 8/2013 | Han et al. |
| 8,532,394 | B2 | 9/2013 | Kameyama |
| 2003/0058943 | A1 | 3/2003 | Zakhor et al. |
| 2003/0123737 | A1* | 7/2003 | Mojsilovic et al. ........... 382/224 |
| 2004/0133910 | A1 | 7/2004 | Gordon et al. |
| 2004/0190633 | A1 | 9/2004 | Ali et al. |
| 2004/0260798 | A1 | 12/2004 | Addington et al. |
| 2005/0111824 | A1 | 5/2005 | Hunter et al. |
| 2006/0015492 | A1 | 1/2006 | Keating et al. |
| 2006/0093188 | A1* | 5/2006 | Blake et al. .................. 382/103 |
| 2007/0074251 | A1 | 3/2007 | Oguz et al. |
| 2007/0239609 | A1 | 10/2007 | Fish et al. |
| 2008/0092159 | A1 | 4/2008 | Dmitriev et al. |
| 2008/0127270 | A1 | 5/2008 | Shipman et al. |
| 2009/0022472 | A1 | 1/2009 | Bronstein et al. |
| 2009/0048842 | A1 | 2/2009 | Albrecht et al. |
| 2009/0063561 | A1 | 3/2009 | Sayko et al. |
| 2010/0086062 | A1 | 4/2010 | Pace |
| 2010/0125871 | A1 | 5/2010 | Liao et al. |
| 2010/0179991 | A1 | 7/2010 | Lorch et al. |
| 2011/0125736 | A1 | 5/2011 | Dave et al. |
| 2011/0218997 | A1 | 9/2011 | Boiman et al. |
| 2011/0246440 | A1 | 10/2011 | Kocks et al. |
| 2012/0099785 | A1 | 4/2012 | Hill et al. |
| 2013/0121584 | A1 | 5/2013 | Bourdev et al. |

OTHER PUBLICATIONS

Cui, J., et al., "Example-Based Image Commpression," 17th IEEE International Conference on Image Processing (ICIP), 2010, 4 Pages.

Datar, M., et al., "Locality Sensitive Hashing Scheme Based on p-Stable Distributions," SoCG'04, Jun. 9-11, 2004, New York, USA, ACM, 10 Pages.

Grundmann, M., et al., "Efficient Hierarchical Graph-Based Video Segmentation," CVPR, 2010, pp. 1-8.

Khan, A., et al., "Content Classification Based on Objective Video Quality Evaluation for MPEG4 Video Streaming over Wireless Networks," Proceedings of the World Congress on Engineering 2009, vol. I WCE 2009, Jul. 1-3, 2009, London, U.K., 6 pages.

Kleinberg, J., et al., "Algorithm Design," Chapter 1, Introduction: Some Representative Problems, Pearson Education Inc., 2006, 13 pages.

MacQueen, J. B., "Some Methods for classification and Analysis of Multivariate Observations," Proceedings of 5-th Berkeley Symposium on Mathematical Statistics and Probability, 1967, Berkeley, University of California Press, vol. 1, pp. 281-297.

Shlens, J., "A Tutorial on Principal Component Analysis-Derivation, Discussion and Singular Value Decomposition," Mar. 25, 2003, PCA-Tutorial-Intuition, Version 1, pp. 1-16, available at <URL:http://www.cs.princeton.edu/picasso/mats/PCA-Tutorial-Intuition.s-ub.—jp.pdf>.

Yianilos, P., "Data Structures and Algorithms for Nearest Neighbor Search in General Metric Spaces," NEC Research Institute Technical Report Fourth, Jun. 1992, 11 pages.

Office Action for U.S. Appl. No. 13/100,872, Sep. 5, 2013, 12 Pages.
Office Action for U.S. Appl. No. 13/076,087, Jun. 11, 2014, 16 Pages.
Office Action for U.S. Appl. No. 13/076,092, Jul. 7, 2014, 22 Pages.
Office Action for U.S. Appl. No. 13/076,094, May 20, 2014, 14 Pages.
Office Action for U.S. Appl. No. 13/083,423, Mar. 25, 2014, 36 Pages.
Office Action for U.S. Appl. No. 13/083,423, Jun. 19, 2014, 23 pages.

* cited by examiner

MODELS FOR PREDICTING SIMILARITY BETWEEN EXEMPLARS

CROSS REFERENCES TO RELATED APPLICATIONS

This application is a continuation of U.S. patent application Ser. No. 13/100,872, filed on May 4, 2011, which claims the benefit of U.S. Provisional Application No. 61/372,079, filed Aug. 9, 2010, each of which is incorporated by reference in its entirety.

FIELD OF THE INVENTION

This invention relates to searching for similar exemplars in a dictionary of digital content using prediction models, including audio, image, and/or video content.

BACKGROUND

Searching for examples similar to a given input example in a dictionary of digital content is often required in applications, for example, image encoding and decoding, texture synthesis, and the like. Digital content includes audio, image, and/or video content. Applications that perform image encoding and decoding often perform multiple dictionary searches. For example, an image being encoded can be divided into several image blocks and a dictionary search performed to find an example image or image block similar to each image block. If the dictionary searches are inefficient, the entire encoding process becomes slow and may not be acceptable.

An example of a conventional approach for dictionary search is a tree-based search. A tree-based search can be performed in a dictionary organized as a tree structure such that leaf nodes of the tree represent similar content. Search is performed by making a decision at each node of the tree regarding which branch of the tree to follow to continue the search. Since each search requires traversing several levels of the tree, each level requiring one or more comparisons of image blocks, the tree-based search is slow.

Conventional tree-based searches also have a drawback in that examples belonging to two different leaf nodes of the tree are not guaranteed to be similar. For example, two neighboring leaf nodes may be neighbors in the tree structure but an image taken from one of the leaf nodes may be very different from an image taken from the neighboring leaf node. As a result, a slight error in traversing the tree caused by taking an incorrect branch of the tree at a higher level of the tree may result in arriving at a leaf node that does not comprise examples similar to the input example. For these reasons, images encoded/decoded using these techniques may have poor quality or the encoding/decoding process may have poor performance.

SUMMARY

The above and other issues are addressed by a computer-implemented method, computer system, and computer program product for generating a prediction model for predicting clusters of similar exemplars for a target block of digital content. Embodiments of the method for generating the prediction model generate clusters of similar exemplars of digital content. Labels are assigned to the clusters of exemplars. The prediction model is generated iteratively. The prediction model is trained using the labels assigned to the clusters of exemplars. The trained prediction model is used to predict labels for the clusters. Strengths of association between the labels assigned to the clusters and labels predicted using the trained prediction model are determined. Labels are reassigned to clusters responsive to the strengths of association between the assigned labels and the predicted labels. The trained prediction model is stored in a computer-readable storage medium.

Embodiments of the computer systems for generating the prediction model include a computer processor and a computer-readable storage medium storing computer program modules. The computer program modules include a clustering module and a dictionary builder module. The clustering module is configured to generate clusters of similar exemplars of digital content. The dictionary builder module is configured to assign labels to the clusters of exemplars and generate the prediction model iteratively. The prediction model is trained using the labels assigned to the clusters of exemplars. The labels are predicted for the clusters using the trained prediction model. Strengths of association between the labels assigned to the clusters and labels predicted using the trained prediction model are determined. Labels are reassigned to clusters responsive to the strengths of association between the assigned labels and the predicted labels. The trained prediction model is stored in a computer-readable storage medium.

Embodiments of the computer program product for generating the prediction model have a computer-readable storage medium storing computer-executable code for compressing a digital image. The computer-executable code includes a clustering module and a dictionary builder module. The clustering module is configured to generate clusters of one or more similar exemplars of digital content. The dictionary builder module is configured to assign labels to the clusters of exemplars and generate the prediction model iteratively. The prediction model is trained using the labels assigned to the clusters of exemplars. The labels are predicted for the clusters using the trained prediction model. Strengths of association between the labels assigned to the clusters and labels predicted using the trained prediction model are determined. Labels are reassigned to clusters responsive to the strengths of association between the assigned labels and the predicted labels. The trained prediction model is stored in a computer-readable storage medium.

Embodiments also determine a predictor block for encoding an input block of digital content. A target block of digital content is received for encoding. A plurality of clusters of exemplars is obtained by applying one or more prediction models to the target block. Each prediction model maps blocks of digital content to clusters of similar exemplars. A frequency of occurrence of exemplars in the plurality of clusters is determined. A predictor block is selected for encoding the target block based on criteria including the frequency of occurrence of exemplars in the plurality of clusters. The target block is encoded using the predictor block.

The features and advantages described in this summary and the following detailed description are not all-inclusive. Many additional features and advantages will be apparent to one of ordinary skill in the art in view of the drawings, specification, and claims hereof.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures.

System Environment and Architectural Overview

Figure 1:
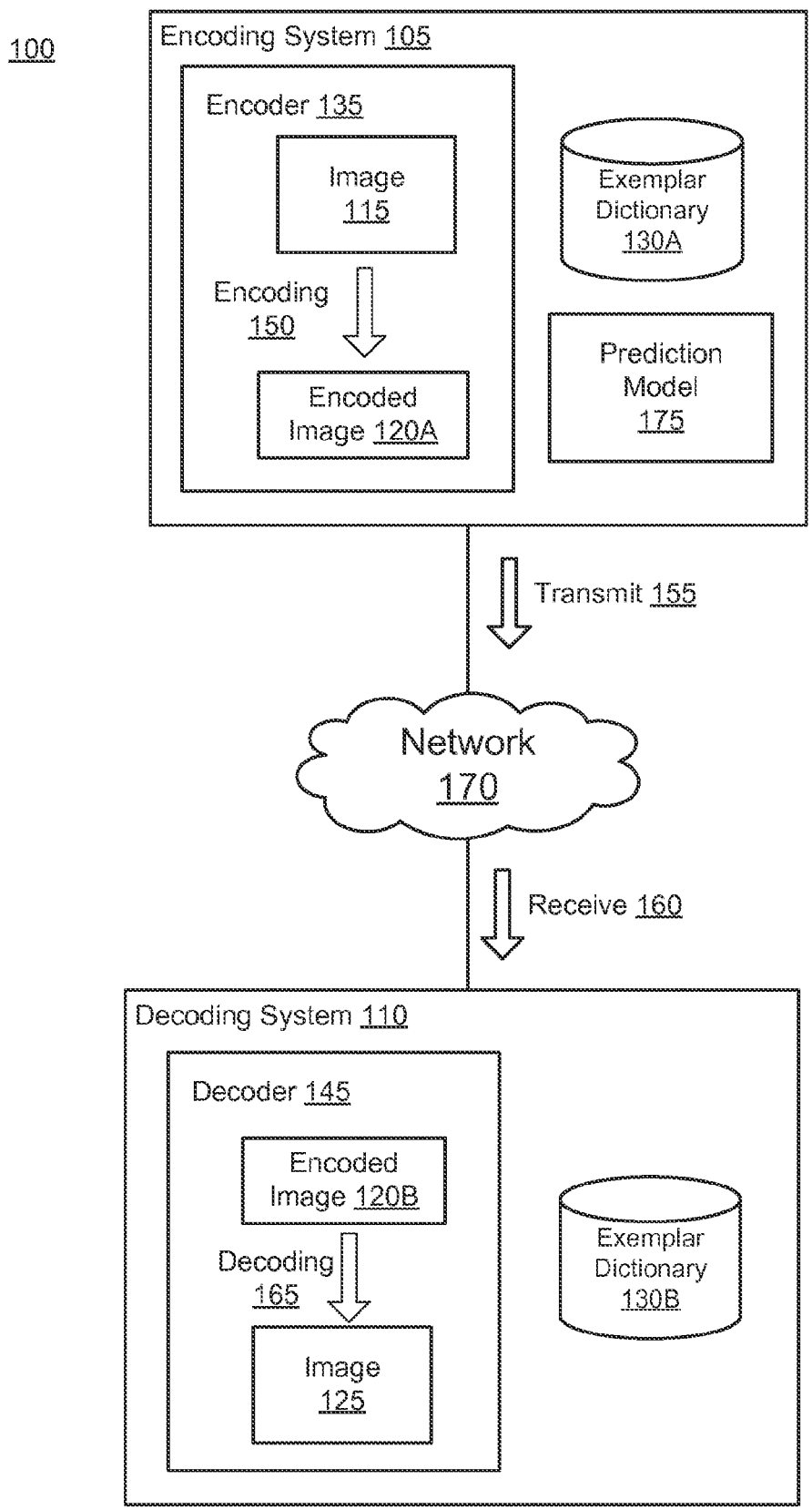
FIG. 1 is a high-level block diagram of a computing environment illustrating the steps of encoding/decoding an image according to one embodiment of the present invention.

FIG. 1 is a high-level block diagram of a computing environment illustrating the steps of encoding and decoding an image according to one embodiment of the present invention. As shown, the computing environment 100 includes an encoding system 105 and a decoding system 110 connected through a network 170. In one embodiment, the encoding system 105 or the decoding system 110 can be a conventional computer system executing, for example, a Microsoft Windows-compatible operating system (OS), Apple OS X, and/or a Linux distribution. In another embodiment, the encoding system 105 or the decoding system 110 can be a device having computer functionality, such as a personal digital assistant (PDA), mobile telephone, video game system, etc.

The network 170 enables communications between the encoding system 105 and the decoding system 110. In one embodiment, the network 170 uses standard communications technologies and/or protocols. Thus, the network 170 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 170 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 170 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. Depending upon the embodiment, the network 170 can also include links to other networks such as the Internet.

FIG. 1 and the other figures use like reference numerals to identify like elements. A letter after a reference numeral, such as "120A," indicates that the text refers specifically to the element having that particular reference numeral. A reference numeral in the text without a following letter, such as "120," refers to any or all of the elements in the figures bearing that reference numeral (e.g. "120" in the text refers to reference numerals "120A" and/or "120B" in the figures).

The encoding system 105 comprises an encoder module 135, an exemplar dictionary 130A, and one or more prediction models 175. The encoder module 135 encodes 150 an original image 115 to generate an encoded image 120A. The original image 115 can be, for example, a still image or an image contained in a frame of video. The encoding 150 compresses the original image 115 to produce an encoded, or "compressed," image 120A that represents the original image using less information (e.g., fewer bits) compared to the original image 115. The encoded image 120A thus provides for efficient storage of the information in the original image 115.

The encoded image 120A also allows for efficient transmission 155 of the information in the original image 115 over the network 170. For example, the encoded image 120A can be transmitted 155 by the encoding system 135 over the network 170 and received 160 by decoding system 110. The encoded image 120B received by the decoding system 110 represents the copy of encoded image 120A held by the decoding system 110.

The encoded image 120A can be transmitted 155 by the encoding system 105 over the network 170 and received 160 by the decoding system 110. This transmission scenario can occur, for example, when a user is using the decoding system 110 to browse the web and download images from web sites. The images can be still images, frames of video arranged in a sequence and stored in a discrete file, and/or frames of video streamed to the decoding system 110. The encoded image 120B received by the decoding system 110 represents the copy of encoded image 120A held by the encoding system 105.

The decoding system 110 comprises a decoder module 145 and an exemplar dictionary 130B. The decoder module 145 can decode 165 the encoded image 120B to obtain a replica of the original image or an approximation of the original image, the "decompressed" image 125. The decoder module 145 uses the exemplar dictionary 130B for identifying predictor blocks used for decoding the blocks of the encoded image 120B. Each predictor block may be identified by a unique identifier within the exemplar dictionary 130B. The encoding/decoding techniques described herein can also be used in non-networked environments.

In one embodiment, the encoding process 150 used by the encoding system 105 uses a block-based technique. In this technique, the image is divided into a set of blocks, such as blocks of 16×16 pixels. A block to be encoded, called a "target block," is encoded by describing the differences between the target block and another block, called the "predictor block." Said another way, the predictor block is used to "predict" the target block, and the result of this prediction is encoded. The encoding system 105 obtains the predictor block from the exemplar dictionary 130A.

The exemplar dictionary 130 is a store of exemplar images, each exemplar image comprising one or more image blocks that can be used as predictors for encoding target blocks in the image 115. The exemplar dictionary 130 is structured to allow the encoding system 105 to search for predictor blocks that are similar to a target block. The exemplar dictionary 130 may comprise a large number of exemplar images, for example, several million exemplar images.

In an embodiment, the exemplar dictionary 130 is organized into clusters of similar exemplars. Each cluster of similar exemplars is associated with a label. One or more prediction models 175 take a target image block as input and predict labels associated with clusters of exemplars similar to the target image block. This allows the encoding system 105 to map a target image block to clusters of exemplars. The encoding system 105 selects a predictor block for the target image block from the exemplars of the mapped clusters.

In an embodiment, the prediction model 175 implements a hashing function that generates a hash key value for a given target image block. The hashing function is configured such that target image blocks that generate the same hash key value are similar to each other. Each hash key value corresponds to a label associated with a cluster from the exemplar dictionary 130. In an embodiment, the hashing function implemented by the prediction model 175A is generated by the machine-learning module 220 further described herein.

In an embodiment, the hashing function of the prediction model 175 maps the target image block to multiple hash key values. Each hash key value generated from the target image block is associated with a cluster of the exemplar dictionary 130. As a result, one target image block is mapped to multiple clusters. Exemplars from the mapped clusters are used to select a predictor block for encoding the target image block. For example, the predictor block can be selected based on the number of mapped clusters that an exemplar belongs to.

The exemplar dictionary 130 can be built either by the encoding system 105, by the decoding system 110, or by any other computing system and transmitted to the encoding system 105 or the decoding system 110 as necessary. Transmission of the exemplar dictionary 130 can be a slow process due to the size of the information stored in the exemplar dictionary 130. The exemplar dictionary 130 can be transmitted either electronically or by physical transmission of a storage device storing the exemplar dictionary 130. The exemplar images stored in the exemplar dictionary 130 can be obtained from various sources, for example, stores of preexisting images in an enterprise.

Figure 2:
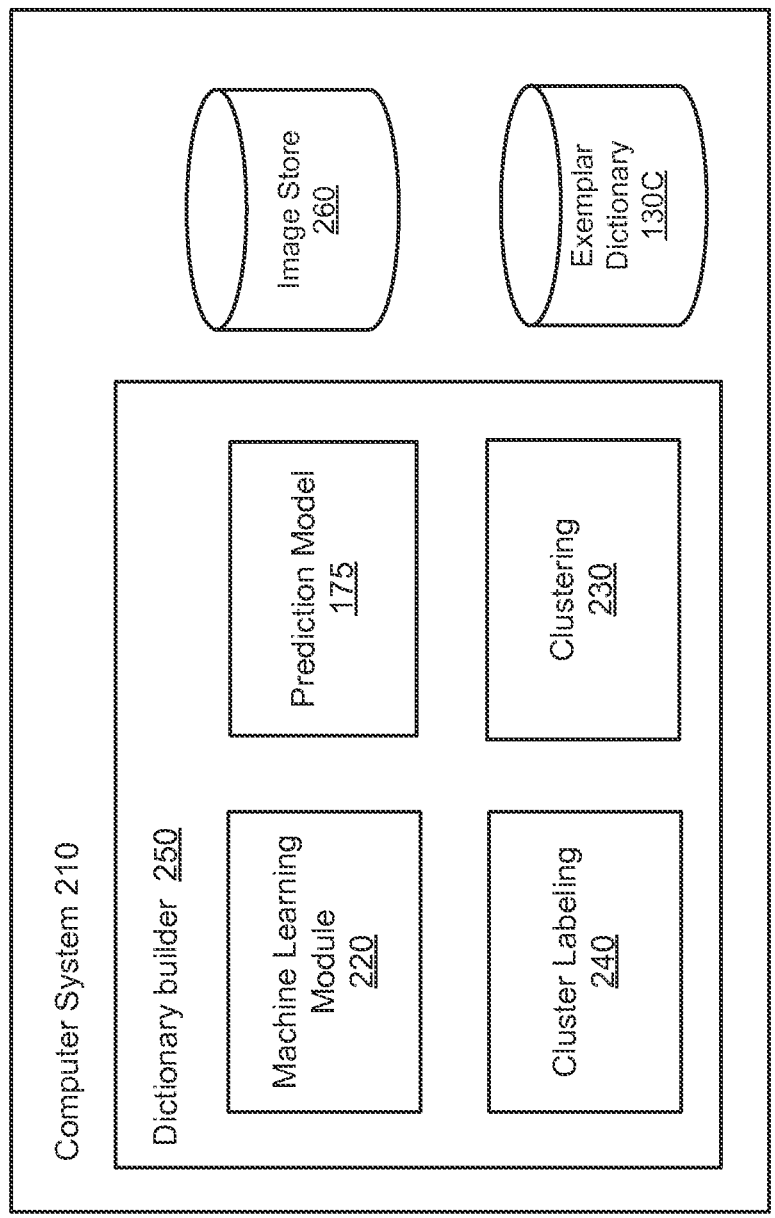
FIG. 2 is a high-level block diagram illustrating modules within a computer system for generating a hashing function for mapping exemplars to labels according to one embodiment of the present invention.

FIG. 2 is a high-level block diagram illustrating modules within a computer system 210 for building an exemplar dictionary 130 according to one embodiment of the invention. The computer system 210 comprises a dictionary builder module 250, an image store 260, and an exemplar dictionary 130C. Some embodiments of the computer system 210 have different and/or other modules than the ones described herein, and the functions can be distributed among the modules in a different manner than described here. For example, the computer system 210 might also include other modules shown in the encoding system 105 or the decoding system 110.

The image store 260 stores a set of exemplar images. The exemplar images can show different types of entities such as buildings, people, animals, birds, trees, natural scenery or combinations of these. The exemplar images may be collected from different sources, for example, images uploaded by users of an image storage system, images obtained by professional stock photography, image galleries, and the like. Each image may include one or more image blocks.

The dictionary builder module 250 builds the exemplar dictionary 130 based on the images in the image store 260. To this end, the dictionary builder module 250 includes a clustering module 230, cluster labeling module 240, a machine learning module 220, and one or more prediction models 175. Other embodiments of the dictionary builder module 250 can have different and/or other modules than the ones described herein, and the functions can be distributed among the modules in a different manner than is described here.

The machine learning module 220 generates one or more prediction models 175. In an embodiment, each prediction model 175 comprises classifiers that produce a binary value for a given exemplar based on certain characteristics of the exemplar. For example, a classifier may generate binary value 0 for exemplars with a particular type of texture and binary value 1 for exemplars without that type of texture. The binary value generated by a binary classifier can be used to divide the input exemplars into two sets or clusters, one cluster corresponding to binary value 0 and the other cluster corresponding to binary value 1. Similarly, two binary classifiers can be used to represent two different characteristics. As a result, two binary classifiers can be used to divide an input set of exemplars into four clusters of exemplars, each cluster corresponding to a combination of binary values, i.e., (0,0), (0,1), (1,0), and (1,1). In general, k binary classifiers can be used to divide the input set of exemplars into $2^k$ clusters, each cluster representing exemplars with a particular combination of characteristics. The binary values corresponding to a cluster can be used to represent a label corresponding to the cluster. Accordingly, the prediction models 175 can be considered as predicting portions of the label corresponding to a cluster for a given exemplar. In an embodiment, the prediction model 175 is represented as a hashing function. The hash keys generated by the hashing function correspond to the labels of the clusters of exemplars.

The machine learning module 220 uses the clustering module 230 and the cluster labeling module 240 to generate the prediction model 175. The dictionary builder 250 uses the prediction model 175 to structure the exemplars from the image store 260 into clusters of similar exemplars stored in the exemplar dictionary 130. The prediction model 175 is also used by the encoder 135 to map an input image block to the clusters of similar exemplars from the exemplar dictionary 130.

In an embodiment, the machine learning module 220 uses the clustering module 230 to determine an initial set of clusters. The clustering module 230 may use a similarity-based clustering method, for example, k-means clustering to determine the clusters. Similarity between exemplars is based on criteria used for comparing images, for example, based on a distance computed using feature vectors representing the images being compared. Distance between feature vectors corresponding to two exemplars can be measured using a distance metric, for example, the L1 norm or the L2 norm.

The cluster labeling module 240 assigns a label to each cluster generated by the clustering module 230. The cluster labeling module 240 performs an initial assignment of labels to the clusters. The initial assignment of labels to the clusters can be random. Each exemplar of a cluster is considered to be mapped to the label corresponding to the cluster. The machine learning module 220 uses the mapping from exemplars to the labels to generate training data sets for the prediction model 175. The machine learning module 220 initially trains the prediction model 175 using the initial assignment of the clusters to the labels which could be random. A random assignment from clusters to labels may not be learnable by the generated prediction model 175. As a result, the prediction model may not accurately predict the assigned labels when applied to exemplars from the cluster. However, the cluster labeling module 240 reassigns the labels to the cluster based on criteria that improves predictability of a prediction model 175 generated from the new mapping. In an embodiment, the reassignment of the labels is based on the prediction model 175 generated from the previous assignment. For example, the prediction model 175 generated by the previous assignment is used to predict labels for exemplars from each cluster. The predicted labels obtained from each cluster are used to determine the reassignment of the labels. The machine learning module 220 trains the prediction model 175 based on the new assignment from clusters to labels. This process is repeated iteratively in order to improve the prediction model 175.

The training set for the prediction model 175 is obtained from a mapping from the clusters to labels. The mapping from clusters to labels can be used to map exemplars belonging to the clusters to the corresponding labels. The training sets comprise subsets of the mapping from exemplars to the labels. For example, if the prediction model 175 comprises a classifier for predicting a bit of a representation of the labels, the training set comprises a set of exemplars that map to a bit value 0 and a set of exemplars that map to a bit value 1. Similar training sets can be obtained for classifiers for predicting each bit of the representation of labels.

The prediction model 175 may not accurately predict the originally mapped label for each exemplar of the cluster. For example, a cluster C1 may be mapped to a label L1 in the random input mapping used for training the prediction model 175 but the model may map several exemplars from cluster C1 to a label L2. The cluster labeling module 240 determines a measure of strength of association between the clusters and the labels based on the predictions made by the prediction model 175. For example, if the prediction model 175 predicts L2 as the label for more than a threshold number of exemplars of clusters C1, the cluster C1 can be considered strongly associated with label L2.

In an embodiment, the cluster labeling module 240 determines the strength of association between each exemplar of the cluster and each label. The strength of association of the cluster with respect to a label is determined based on an aggregate strength of association of exemplars belonging to the cluster with the label. The aggregate strength of association may be determined using a statistical aggregate measure, for example, an average value, a median value or any other statistical measure for aggregating scores.

In an embodiment, the strength of association of an exemplar with a particular label is based on the Hamming distance between the particular label and the predicted label for the exemplar. For example, the association of an exemplar with a particular label is inversely proportional to the Hamming distance between the label and the predicted label for the exemplar. Accordingly, if the predicted label is close to a label based on the Hamming distance, the exemplar is considered strongly associated with that label. On the other hand, if the predicted label for the exemplar has a large Hamming distance compared to a label, the exemplar is determined to be less strongly associated with the label.

The strength of association of a cluster with respect to a label is determined as an aggregate value of the strengths of associations of the exemplars belonging to the cluster with respect to the label. For example, the strengths of association of individual exemplars belonging to a cluster C1 can be indicated as shown in Table I below.

TABLE I

| Exemplars | Label L1 | Label L2 | ... | Label LN |
| --- | --- | --- | --- | --- |
| Exemplar E1 | s(1, 1) | s(1, 2) | ... | s(1, N) |
| Exemplar E2 | s(2, 1) | s(2, 2) | ... | s(2, N) |
| ... | ... | ... | ... | ... |
| Exemplar EM | s(M, 1) | s(M, 2) | ... | s(M, N) |

As shown in Table I, the strength of association of exemplar Ei with respect to label Lj is shown as score value s(i,j), where i can be any one of values 1, 2, 3, ... M and j can be any one of values 1, 2, 3, ... N. The strength of association of cluster C1 with respect to label L1 can be determined using an aggregate value based on the score values s(1,1), s(2,1), ..., s(M,1) that are present in the column under label L1. Similarly, the strength of association of cluster C1 with respect to any label Li can be determined using an aggregate value based on the score values s(1,i), s(2,i), ..., s(M,i) that are present in the column under label Li.

The process of determining the strength of association for a cluster can be repeated for each cluster. As a result, the strength of association of each cluster with respect to each label is obtained. Table II below shows an example mapping from clusters C1, C2, ..., CN to labels L1, L2, ..., LN. The strength of association of a cluster Ci with a label Lj is represented as a value score(i,j).

TABLE II

| Clusters | Label L1 | Label L2 | ... | Label LN |
| --- | --- | --- | --- | --- |
| Cluster C1 | score(1, 1) | score(1, 2) | ... | score(1, N) |
| Cluster C2 | score(2, 1) | score(2, 2) | ... | score(2, N) |
| ... | ... | ... | ... | ... |
| Cluster CN | score(N, 1) | score(N, 2) | ... | score(N, N) |

A cluster may be associated with a label in the current mapping but may have a higher score indicating strength of association with another label. For example cluster C1 may be mapped to L1 in the current mapping but the score value score(1,2) may be higher than the score value score(1,1) indicating that the cluster C1 has a better strength of association with respect to label L2 than label L1. It is possible that several clusters have higher strength of association with a label other than the label that the cluster is currently mapped to. Accordingly, a new mapping from the clusters to the labels can be determined based on the strengths of associations indicated in Table II that improves the overall strengths of associations between clusters and labels.

The cluster labeling module 240 reassigns labels to clusters such that the new mapping has an improved aggregate strength of association between exemplars of each cluster and the mapped label compared to the previous mapping. The process of determining a mapping that maximizes the overall strength of association between clusters and labels can be solved using a combinatorial optimization algorithm. In an embodiment, the clusters and labels are represented as nodes of a graph. An edge connecting a cluster to a label is associated with a weight representing the strength of association between the cluster and the label. The graph between the clusters and labels so obtained is a weighted bipartite graph in which all the edges are from the set of nodes representing the clusters to the set of nodes representing the labels. The bipartite graph representation can be used to determine a mapping that optimizes the strength of association between clusters and labels using the Hungarian-matching algorithm that performs maximum weight matching of the bipartite graph connecting clusters to labels. The maximum weight matching algorithm swaps two edges of the bipartite graph if the swapping improves the aggregate strength of association between clusters and labels for the bipartite graph.

The new mapping from clusters to labels is used to generate new training data sets that are provided to the machine learning module 220. The machine learning module 220 learns a new hashing function based on the new training data set. The cluster labeling module 240 again determines the strength of association between the clusters and the labels based on the new hashing function. The cluster labeling module 240 repeats the process of reassigning the clusters to the labels so as to improve an aggregate measure of strength of association between the clusters and the labels.

The reassignment of labels of clusters is repeated multiple times to improve the aggregate measure of strength of association between the exemplars of the clusters and the assigned labels. The process of reassignment can be repeated until the incremental improvement in the aggregate measure of strength of association between two subsequent reassignments is below a threshold level. Alternatively, the process of reassignment can be repeated for a predetermined number of iterations.

Generating the Prediction Model

Figure 3:
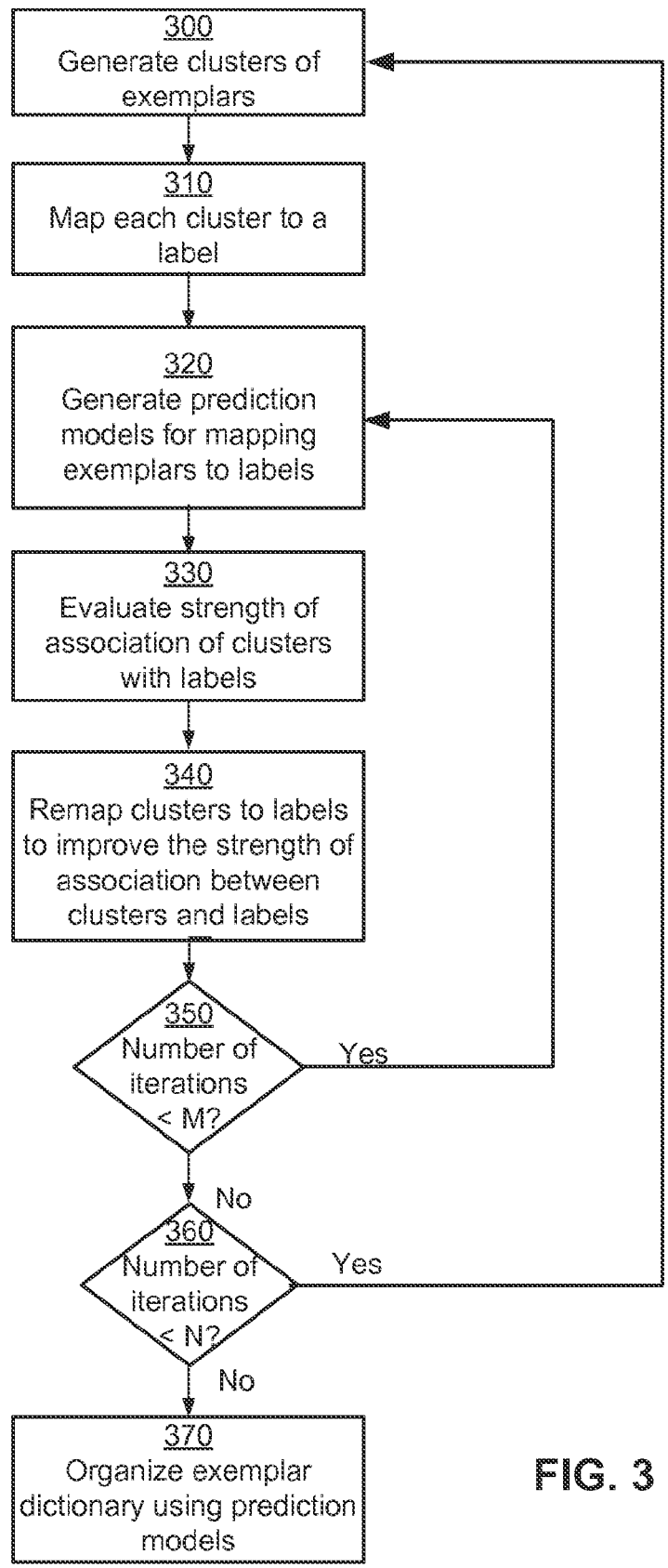
FIG. 3 is a flow diagram illustrating a process for generating the hashing function based on machine learning according to one embodiment of the present invention.

FIG. 3 is a flowchart illustrating the process for generating the prediction model for predicting labels for exemplars using machine learning, according to an embodiment of the invention. The clustering module 230 generates 300 a set of clusters based on an input set of exemplars. The cluster labeling module 240 maps 310 each cluster to a label. The initial mapping of clusters to labels can be random. The machine learning module 220 generates 320 a prediction model for predicting labels for a given exemplar. The prediction model is iteratively refined to improve the quality of prediction of the model. The quality of prediction of the model can be measured based on the accuracy with which the model maps an input exemplar to a cluster of exemplars similar to the input exemplar. The prediction model 175 is trained using a training data set obtained from the current mapping of clusters to labels.

The cluster labeling module 240 evaluates 330 a measure of strength of association of clusters with labels. The prediction model 175 is used to predict labels for exemplars belonging to a cluster. The cluster labeling module 240 evaluates 330 the strength of association of each cluster with the labels. The cluster labeling module 240 determines an association of a cluster with a label based on an aggregate value of the associations of the exemplars belonging to the cluster with the label.

The cluster labeling module 240 remaps 340 the clusters to the labels based on the strength of association between clusters and labels. The new mapping of labels to clusters improves the overall strength of association between the clusters and labels as aggregated over all the clusters compared with the previous mapping. The cluster labeling module 240 repeats until a stopping condition is reached. Examples of stopping conditions include a counter reaching 350 a predetermined number of iterations or the number of changes in labels during remapping 340 being below a threshold value. The cluster labeling module 240 checks 350 if the process of determining the prediction models has been repeated at least a predetermined number of times. For each iteration, the cluster labeling module 240 determines 320 a new prediction model 175, evaluates 330 the strength of association between the clusters and the labels, and remaps 340 clusters based on the strength of association between the clusters and the labels.

In an embodiment, the cluster labeling module 240 repeats 360 the overall process including the steps 300, 310, 320, 330, 340, and 350 to generate multiple prediction models 175. The process can be repeated by varying various parameters associated with the process, for example, by using different input sets of exemplars for determining the initial set of clusters, by using a different machine learning technique, or by using different sets of feature vectors for representing the exemplars. As a result, several prediction models 175 for predicting the label for a given exemplar are obtained from the process illustrated in FIG. 3. In an embodiment, the different sets of clusters may be processed concurrently, for example, on different processors. The prediction models 175 are stored. The prediction models 175 may be stored at other stages of the process, for example, after step 320.

The dictionary builder module 250 uses the prediction model 175 to organize 370 the exemplar dictionary 130. The dictionary builder module 250 applies the prediction model 175 to a set of input exemplars and determines the label corresponding to each exemplar. The dictionary builder module 250 assigns exemplars mapping to the same label to the same cluster. If there are multiple prediction models, each exemplar is mapped to multiple labels and belongs to multiple clusters. The exemplar dictionary 130 stores the information describing each cluster and the associated label.

Encoding Images Using the Exemplar Dictionary

Figure 4:
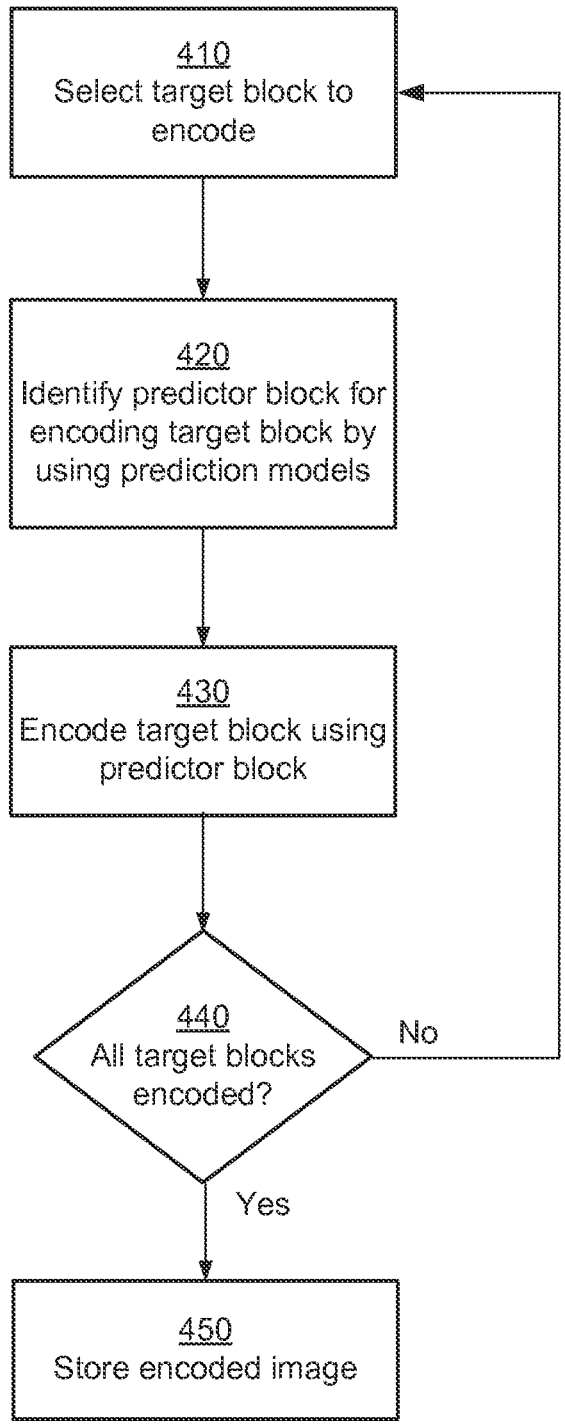
FIG. 4 is a flow diagram illustrating a process for encoding an image according to one embodiment of the present invention.

The exemplar dictionary 130 can be used to determine exemplars similar to a given input block of digital content, for example, for selecting predictor blocks for encoding an image. FIG. 4 is a flowchart illustrating steps performed by an embodiment of the image encoder module 135 for encoding an image. Other embodiments can perform different and/or additional steps. Moreover, other embodiments can perform the steps in different orders. Further, the steps can be performed by entities other than the module specified in the description of FIG. 4.

The encoder module 135 selects 410 a target block of an image 115 to encode. The encoder module 135 may select 410 the target block based on a scan-line order of traversal of the blocks of the image, a reverse scan-line order of traversal or any other order of traversal of the blocks of the image. The encoder module 135 identifies 420 a predictor block from the exemplar dictionary 130 using the prediction model 175 as further described using the flowchart of FIG. 5. The encoder module 135 encodes 430 the target block using information used to identify the predictor block and residual information. The encoder module 135 checks 440 if there are more blocks to be encoded. The above steps of encoding including steps 410, 420, and 430 are repeated until all target blocks are encoded. The encoder module 135 stores 450 the encoded image in the image store 260. In an embodiment, the target blocks of the image may be stored 450 before the processing of the next target block begins.

Selecting a Predictor Block

Figure 5:
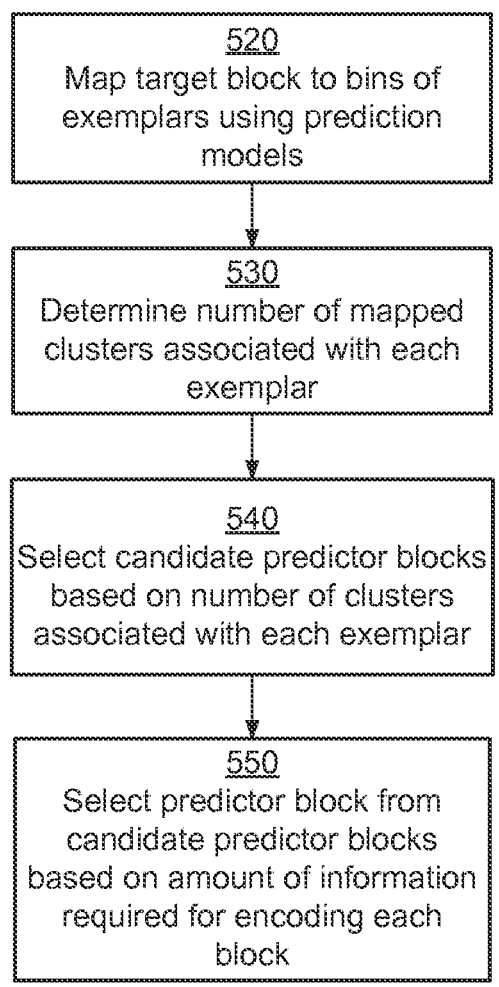
FIG. 5 is a flow diagram illustrating a process for identifying a predictor block for encoding a target block according to one embodiment of the present invention.

FIG. 5 illustrates the details of the step 420 for identifying a predictor block for a target image block according to an embodiment of an invention. In an embodiment, the encoder 135 uses multiple prediction models to map 520 a target image block to multiple labels. The encoder module 135 determines 530 the number of mapped clusters associated with each exemplar. For example, a prediction model M maps 520 the target image block to label L1, a prediction model M2 maps the target image block to label L2, and prediction model M3 maps the target image block to label L3. The labels L1, L2, and L3 are assumed to be associated with clusters C1, C2, and C3 of the exemplar dictionary 130 respectively. Assume cluster C1 comprises exemplars {e1, e2, e3}, cluster C2 comprises exemplars {e1, e4, e5} and cluster C3 comprises exemplars {e1, e2, e6}. In this example, the exemplar e1 is associated with all three clusters mapped to the target image block, exemplar e2 is associated with only two mapped clusters C1 and C3, and the remaining exemplars e3, e4, e5, and e6 are associated with one mapped cluster each. Accordingly, exemplar e1 is associated with the highest number of clusters, followed by e2, followed by the remaining clusters. The number of clusters associated with each exemplar is used to select 540 a set of candidate predictor blocks. An exemplar that belongs to a large number of mapped clusters is considered higher in a degree of similarity with respect to the target image block. The exemplars may be ranked based on their frequency of occurrence in the mapped clusters to select the candidate predictor blocks.

The predictor block is selected 550 from the candidate predictor blocks based on certain selection criteria. For example, a selection criterion selects the exemplar that minimizes the amount of information used encode the predictor block. The information used to encode a predictor block comprises the information used to identify the predictor block combined with the residual information representing a difference between the target image block and the predictor block. Another selection criterion selects 550 the candidate predictor block that minimizes a measure of distance compared to the target image block. Another selection criterion selects 550 the candidate predictor block that has the highest frequency of occurrence in the clusters mapped to the target image block. The various selection criteria can be combined together. For example, a score based on frequency of occurrence of exemplars in the mapped clusters can be combined with the information required to encode the exemplars. In an embodiment, the selection criteria are combined as a weighted aggregate value.

Image Decoding

Figure 6:
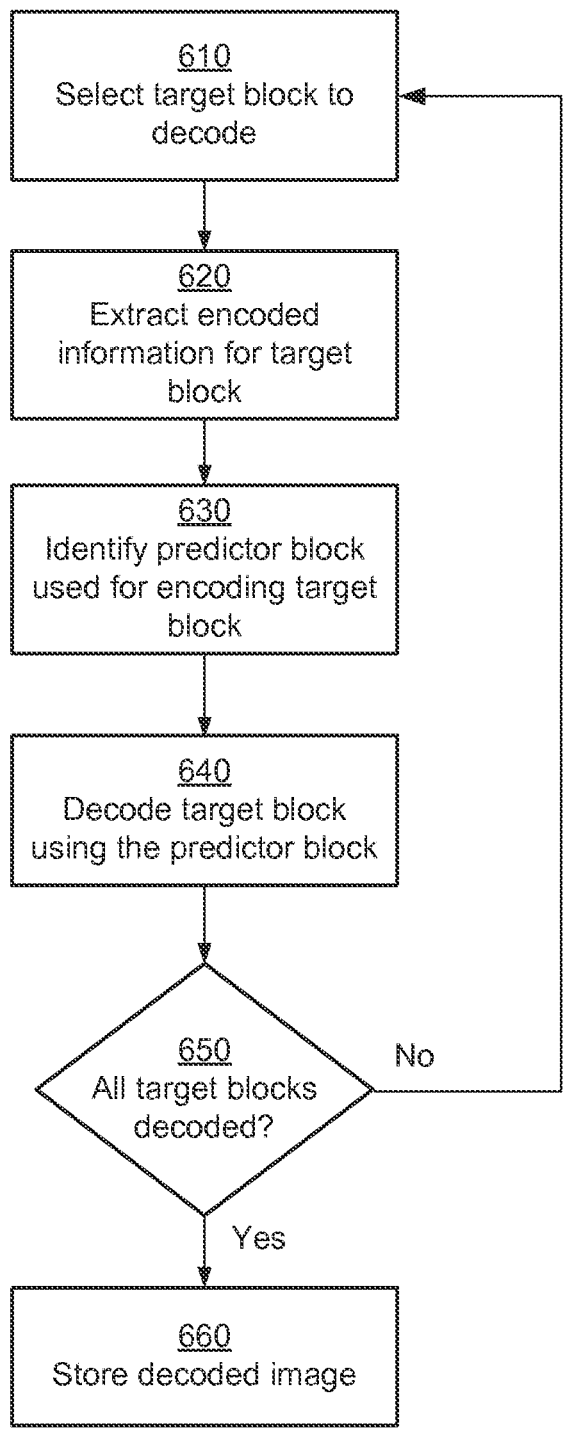
FIG. 6 is a flow diagram illustrating a process for decoding an image according to one embodiment of the present invention.

FIG. 6 is a flowchart illustrating steps performed by an embodiment of the image decoder module 145 for decoding an image encoded by the image encoder module 135. The image decoder module 145 selects 610 the next target block to decode. The image decoder module 145 extracts 620 the information for the target block from within the encoded image. The extracted information comprises information identifying a predictor block used for encoding the target block and residual information between the predictor block and the encoded target block.

The image decoder module 145 identifies 630 the predictor block used for encoding the target block. The image decoder module 145 decodes 640 the block based on the predictor block and the residual information available in the encoded target block. The image decoder module 145 checks 650 if all target blocks are decoded and continues decoding the remaining target blocks. The decoded image is stored 660 in the image store 260. In an embodiment, the decoded blocks may be stored 660 in the image store 260 while subsequent blocks are being decoded.

The processes described herein, for example, the process for building the exemplar dictionary, for encoding and decoding images can be generalized to any kind of digital content, including videos, images, audio and the like. For example, an exemplar dictionary can be built using exemplars of audio content and used for encoding/decoding of digital audio content. Similarly, an exemplar dictionary can be built using exemplars of videos and used for encoding/decoding digital video content.

Computer Architecture

Figure 7:
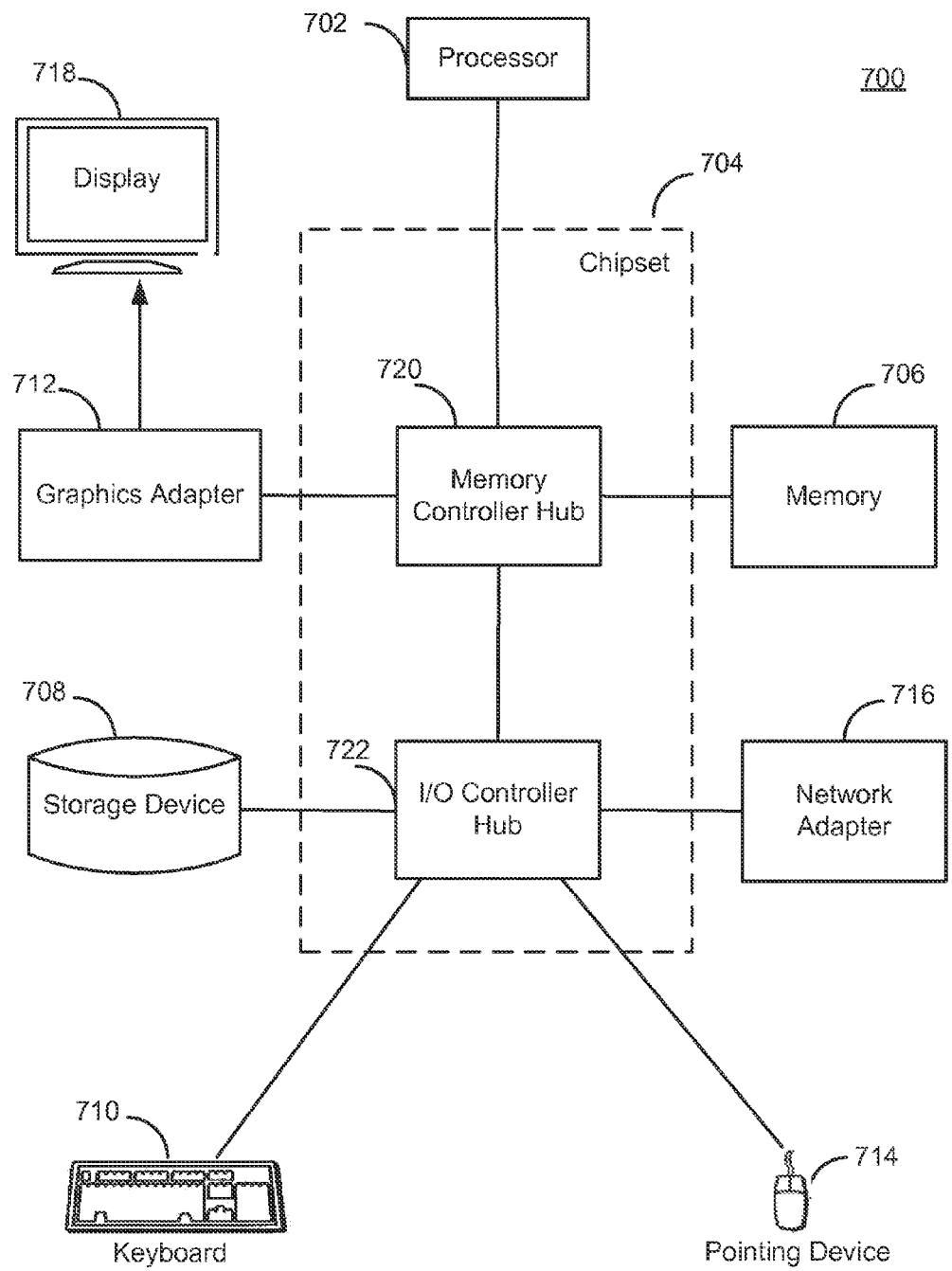
FIG. 7 is a high-level block diagram illustrating an example of a computer for use in the computing environment shown in FIG. 1 according to one embodiment of the present invention.

FIG. 7 is a high-level block diagram illustrating an example computer 700, such as the encoding/decoding systems 105, 110 shown in FIG. 1 and the computer system 210 shown in FIG. 2. The computer 700 includes at least one processor 702 coupled to a chipset 704. The chipset 704 includes a memory controller hub 720 and an input/output (I/O) controller hub 722. A memory 706 and a graphics adapter 712 are coupled to the memory controller hub 720, and a display 718 is coupled to the graphics adapter 712. A storage device 708, keyboard 710, pointing device 714, and network adapter 716 are coupled to the I/O controller hub 722. Other embodiments of the computer 700 have different architectures.

The storage device 708 is a non-transitory computer-readable storage medium such as a hard drive, compact disk read-only memory (CD-ROM), DVD, or a solid-state memory device. The memory 706 holds instructions and data used by the processor 702. The pointing device 714 is a mouse, track ball, or other type of pointing device, and is used in combination with the keyboard 710 to input data into the computer system 700. The graphics adapter 712 displays images and other information on the display 718. The network adapter 716 couples the computer system 700 to one or more computer networks.

The computer 700 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 708, loaded into the memory 706, and executed by the processor 702.

The types of computers 700 used as the computer systems of FIG. 1 can vary depending upon the embodiment and requirements. For example, the encoding system 105 used for encoding might include one or more blade computers lacking displays, keyboards, and/or other devices shown in FIG. 7. Likewise, the decoding system 110 used for decoding might comprise a mobile phone or other such device with a touch-sensitive display and limited processing power.

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for building/using an exemplar dictionary for image compression. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus disclosed herein without departing from the spirit and scope as defined in the appended claims.

What is claimed is:

1. A computer-implemented method for generating a prediction model for predicting clusters of similar exemplars for a target block of digital content, the method comprising:
   receiving a set of labels and a set of clusters, each cluster comprising similar exemplars of digital content;
   generating an initial mapping from the set of clusters to the set of labels, the mapping assigning a label to each cluster; and
   generating the prediction model for predicting clusters of similar exemplars for a target block of digital content, the generating comprising iteratively:
      training the prediction model using the labels assigned to the clusters of exemplars;
      predicting labels for exemplars of the clusters using the trained prediction model;
      determining strengths of association between the labels assigned to the clusters and labels predicted using the trained prediction model; and
      generating a new mapping from the same set of clusters to the same set of labels by reassigning labels to clusters based on the strengths of association between the assigned labels and the predicted labels.

2. The method of claim 1, further comprising:
   generating clusters of the one or more similar exemplars, the generating comprising:
      determining similarity among a plurality of exemplars of digital content; and
      clustering the plurality of exemplars into a plurality of clusters based on the determined similarity, wherein similar exemplars are clustered together.

3. The method of claim 1, further comprising:
   assigning random labels to the clusters of exemplars, wherein each cluster is assigned a different random label.

4. The method of claim 1, wherein the prediction model comprises a plurality of classifiers, and training the prediction model comprises training the plurality of classifiers using the assigned labels.

5. The method of claim 1, wherein predicting labels for the exemplars of the clusters using the trained prediction model comprises applying the trained prediction model to exemplars within a cluster to produce predicted labels for the exemplars in the cluster.

6. The method of claim 5, wherein determining strengths of association between the labels assigned to the clusters and labels predicted using the trained prediction model comprises determining a strength of association between the predicted labels for the exemplars in the cluster and a label assigned to the cluster.

7. The method of claim 6, wherein the strength of association between the predicted labels for the exemplars in the cluster and a label assigned to the cluster is based at least in part on a Hamming distance between a predicted label for an exemplar in the cluster and the label assigned to the cluster.

8. The method of claim 1, wherein reassigning labels to clusters comprises assigning labels to clusters to improve the strengths of association between the assigned labels and the predicted labels.

9. The method of claim 8, wherein reassigning labels to clusters comprises using a combinatorial optimization algorithm to identify a new assignment of labels to clusters that maximizes strength of association between the assigned labels and the predicted labels.

10. The method of claim 1, wherein generating the prediction model comprises iterating until the reassigning of labels to clusters based on the strengths of association between the assigned labels and the predicted labels produces an incremental improvement in strengths of association that is below a threshold level of improvement.

11. The method of claim 1, further comprising:
    receiving a set of dictionary exemplars for creating an exemplar dictionary;
    applying the prediction model to the dictionary exemplars to produce dictionary labels for the exemplars;
    clustering the dictionary exemplars based on the dictionary labels assigned to the exemplars; and
    storing the clustered dictionary exemplars as the exemplar dictionary.

12. The method of claim 1, wherein generating the prediction model further comprises:
    representing the set of clusters and the set of labels as nodes of a bipartite graph, wherein an edge between a cluster and a label is associated with a weight based on the strength of association between the cluster and the label; and
    wherein generating the new mapping comprises optimizing the strength of association between the set of clusters and set of edges of the bipartite graph.

13. The method of claim 12, wherein optimizing the strength of association is based on a Hungarian-matching process.

14. The method of claim 12, wherein the generating the new mapping comprises swapping two edges of the bipartite graph if the swapping improves an aggregate strength of association between the same set of clusters and the same set of labels.

15. A computer-implemented system for generating a model for predicting clusters of similar exemplars for a given exemplar of digital content, the system comprising:
    a computer processor; and
    a non-transitory computer-readable storage medium storing computer program modules configured to execute on the computer processor, the computer program modules comprising instructions for:
       receiving a set of labels and a set of clusters, each cluster comprising similar exemplars of digital content;

generating an initial mapping from the set of clusters to the set of labels, the mapping assigning a label to each cluster; and generating the prediction model for predicting clusters of similar exemplars for a target block of digital content, the generating comprising iteratively:

training the prediction model using the labels assigned to the clusters of exemplars;

predicting labels for exemplars of the clusters using the trained prediction model;

determining strengths of association between the labels assigned to the clusters and labels predicted using the trained prediction model; and generating a new mapping from the same set of clusters to the same set of labels by reassigning labels to clusters based on the strengths of association between the assigned labels and the predicted labels.

16. The computer-implemented system of claim 15, wherein the prediction model comprises a plurality of classifiers, and training the prediction model comprises training the plurality of classifiers using the assigned labels.

17. A computer program product having a non-transitory computer-readable storage medium storing computer-executable code for generating a model for predicting clusters of similar exemplars for a given exemplar of digital content, the code comprising instructions for:

receiving a set of labels and a set of clusters, each cluster comprising similar exemplars of digital content;

generating an initial mapping from the set of clusters to the set of labels, the mapping assigning a label to each cluster; and generating the prediction model for predicting clusters of similar exemplars for a target block of digital content, the generating comprising iteratively:

training the prediction model using the labels assigned to the clusters of exemplars;

predicting labels for exemplars of the clusters using the trained prediction model;

determining strengths of association between the labels assigned to the clusters and labels predicted using the trained prediction model; and generating a new mapping from the same set of clusters to the same set of labels by reassigning labels to clusters based on the strengths of association between the assigned labels and the predicted labels.

18. The computer program product of claim 17, wherein the prediction model comprises a plurality of classifiers, and training the prediction model comprises training the plurality of classifiers using the assigned labels.

19. The computer program product of claim 17, wherein predicting labels for the exemplars of the clusters using the trained prediction model comprises applying the trained prediction model to exemplars within a cluster to produce predicted labels for the exemplars in the cluster.

20. The computer program product of claim 19, wherein determining strengths of association between the labels assigned to the clusters and labels predicted using the trained prediction model comprises determining a strength of association between the predicted labels for the exemplars in the cluster and a label assigned to the cluster.

\* \* \* \* \*